UNITED STATES PATENT OFFICE.

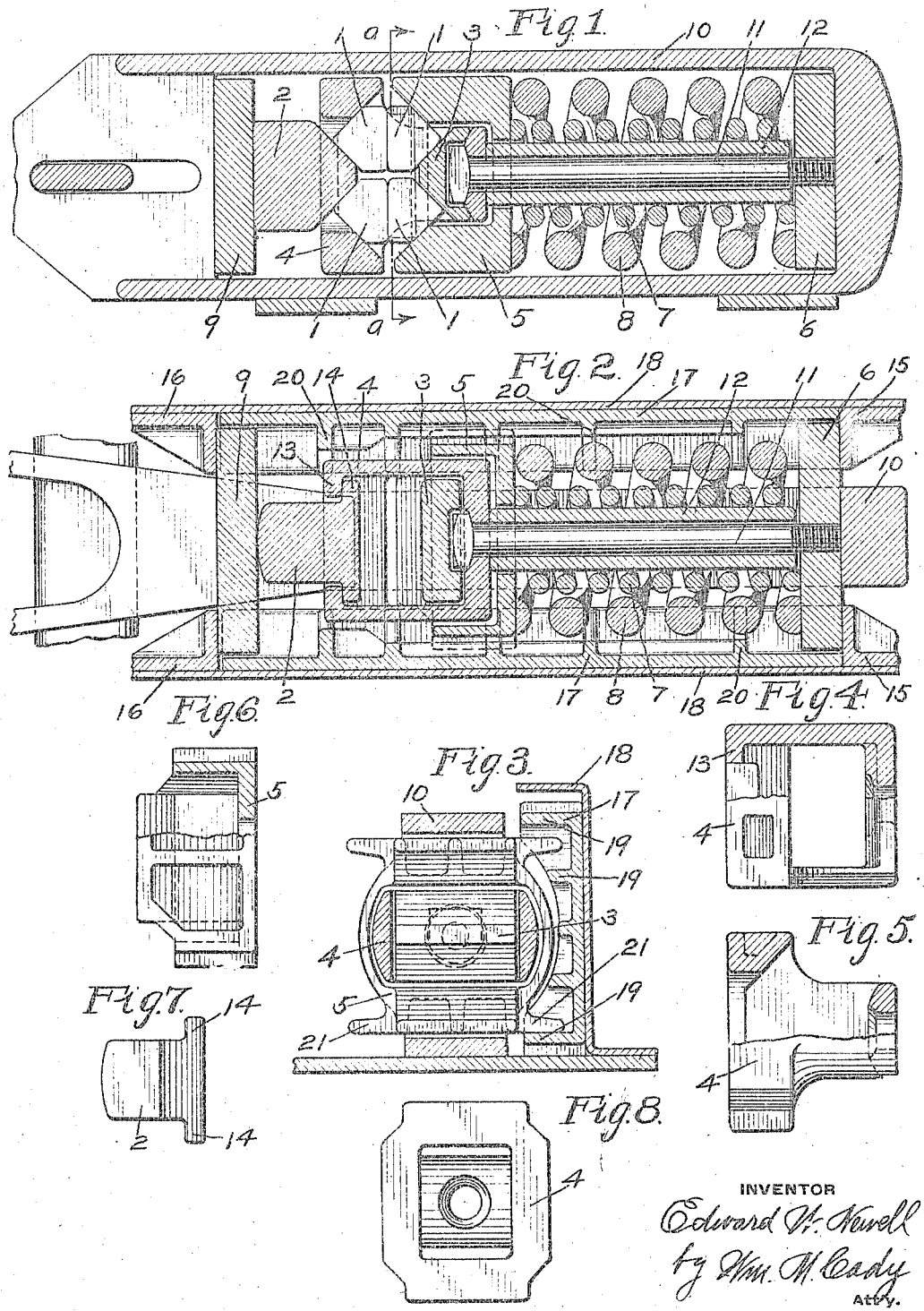

EDWARD W. NEWELL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT-GEAR.

1,295,053.   Specification of Letters Patent.   Patented Feb. 18, 1919.

Application filed April 14, 1916. Serial No. 91,234.

*To all whom it may concern:*

Be it known that I, EDWARD W. NEWELL, a citizen of the United States, residing at Pittsburgh, in the county of Allegheny and State of Pennsylvania, have invented new and useful Improvements in Friction Draft-Gear, of which the following is a specification.

This invention relates to draft gear for railway vehicles, and one object of my invention is to provide improved means for transmitting stresses, under buffing and draft movements, which exceed the capacity of the draft gear.

Another feature of my invention relates to friction draft gear of the type employing laterally and longitudinally movable wedge blocks and in which means are provided for holding the wedge blocks in position under buffing and draft stresses, the object, in this instance, being to provide improved means for holding the wedge blocks in position.

In the accompanying drawing, Figure 1 is a vertical longitudinal section of a draft gear construction embodying my improvements; Fig. 2 a horizontal section thereof; Fig. 3 a transverse section on the line *a—a* of Fig. 1; Fig. 4 a partly sectional plan view of the forward friction member; Fig. 5 a partly sectional side view thereof; Fig. 6 a partly sectional view of the rear friction member; Fig. 7 a side view of the front plunger wedge; and Fig. 8 a face view of the forward friction member.

As shown in the drawing, the friction draft gear may comprise wedge blocks 1, each having oppositely inclined friction faces, a forward plunger wedge 2 having oppositely inclined friction faces adapted to engage corresponding friction faces of the wedge blocks 1, a rear plunger wedge 3 having oppositely inclined friction faces for engaging friction faces of the wedge blocks, a forward friction member 4 and a rear friction member 5, each having oppositely inclined friction faces for engaging corresponding friction faces of the wedge blocks.

Between the rear friction member 5 and the rear follower plate 6 are mounted draft springs 7 and 8 and the forward plunger wedge 2 engages a front follower plate 9, the draft gear parts being inclosed within a yoke 10 of the usual construction.

A centrally arranged bolt 11 is screwed into the rear follower plate 6 and the head of the bolt bears against an inner face of the member 4, a recess being provided in the rear plunger wedge 3 for receiving said head.

A sleeve 12 surrounds the bolt 11 and extends from the member 4 to the rear follower 6 and serves with bolt 11 as the means for transmitting buffing stresses to the rear follower.

The forward friction member 4 may be provided with inwardly extending flanges 13 adapted to engage lugs 14 on the front central plunger wedge 2, so that the parts can be assembled and held together for application as a self-contained gear.

In operation, when a buffing stress is applied to the draw-bar, the follower plate 9 is forced rearwardly thereby, causing the rearward movement of the plunger wedge 2.

The rear plunger wedge 3 is prevented from rearward movement by bolt 11 and the sleeve 12 engaging the rear follower plate 6 which is held against rearward movement by the stops 15. The movement of plunger wedge 2 therefore causes the rearward and lateral movement of the wedge blocks 1, forcing the rear friction member rearwardly against the resistance of springs 7 and 8.

In this movement, the forward friction member 4 holds the wedge blocks 1 in position, since this member incloses the wedge blocks 1 and the rear plunger wedge 3.

Under a draft stress, the yoke 10 is pulled forward, causing the rear plunger wedge 3 to move forward through the movement of the rear follower plate 6. The forward plunger wedge 2 is held stationary through engagement with the front follower plate 9 which bears against the stops 16, so that the wedge blocks 1 are forced laterally and forwardly, and the springs 7 and 8 being compressed by the forward movement of the follower 6, the pressure of the springs is transmitted through the member 5, so as to resist the movement of the wedge blocks 1.

As under buffing stresses, the friction member 4 serves to maintain the wedge blocks 1 in position, so that the desired frictional resistance is set up.

Another feature of my invention consists in providing detached stops for transmitting stresses in excess of the capacity of the draft gear. As shown in the drawing, the detached stop may comprise a casting 17 comprising a plate section adapted to bear against one of the car center sills 18 and having horizontally arranged rib sections 19 and transverse rib sections 20.

Since the stop casting 17 is not secured to the car structure, the same can be placed in position on opposite sides of the draft gear and then installed in position between the car center sills, and this permits the construction of the stop to conform closely to the contour of the draft gear, as shown. It being evident that were the stop secured to the center sill of the car, it would be necessary to provide clearance from below, to permit the placing of the draft gear in position.

Since detached stops can be made to conform to the contour of the draft gear, the same can be made very rigid and amply strong to resist stresses without buckling.

Under buffing stresses, the front follower 9 will engage the foremost transverse rib section 20, if the stress exceeds the capacity of the draft gear, so that such stress will be directly transmitted through the detached stops 17 to the rear stops 15. In a similar manner, if the draft stress should exceed the capacity of the draft gear, the rear follower 6 will engage the rearmost rib section 20, so that the stress will be transmitted through the detached stops 17 to the forward stops 16.

As shown more clearly in Fig. 3 of the drawing, the member 5 may be provided with horizontally extending flanges 21 adapted to rest on the top face of the bottom horizontal rib section 19 of the detached stop, thus serving as a support for the draft gear.

Being detached from the car structure, the stops can be easily applied and renewed when damaged and may be made of a material best suited to withstand compression shocks, thus lessening the cost of installation and repairs to distorted center sills, since there are no rivets to remove or replace.

The main reason for employing the bolt 11 secured to the rear follower 6 is to insure the release of the parts after a draft stress has been applied, it being noted that in release, the follower plate 6 will be forced rearwardly by the draft springs 7 and 8 and the bolt 11 is therefore pulled rearwardly, causing the rearward movement of the forward friction member 4 and the wedge blocks 1.

Having now described my invention, what I claim as new and desire to secure by Letters Patent, is:—

1. In a friction draft gear, the combination with laterally and longitudinally movable wedge blocks having oppositely inclined friction faces, of a centrally arranged plunger wedge having friction faces adapted to engage friction faces of the wedge blocks, and a member having friction faces engaging friction faces of said wedge blocks and provided with a yoke extension for maintaining the plunger wedge in engagement with the wedge blocks.

2. In a friction draft gear, the combination with laterally and longitudinally movable wedge blocks having oppositely inclined friction faces, of a centrally arranged plunger wedge having friction faces adapted to engage friction faces of the wedge blocks, and a member having friction faces engaging friction faces of said wedge blocks and provided with a yoke extension for maintaining the plunger wedge in engagement with the wedge blocks, a rear follower plate, and a bolt connecting said member with said follower plate.

3. In a friction draft gear, the combination with front and rear follower plates, of a loop shaped member having oppositely inclined friction faces, a rear central plunger wedge having oppositely inclined friction faces, wedge blocks having oppositely inclined friction faces for engaging the friction faces of the plunger wedge and said member, the wedge blocks and the plunger wedge being inclosed within the loop shaped member, and a bolt connecting said member with the rear follower plate.

In testimony whereof I have hereunto set my hand.

EDWARD W. NEWELL.